United States Patent Office 3,312,671
Patented Apr. 4, 1967

3,312,671
COPOLYMERS OF 2-SODIOSULFOETHYL ACRYLATE AND ACRYLAMIDE
David H. Swisher, Lake Jackson, Tex., assignor to The Dow Chemical Company, Midland, Mich., a corporation of Delaware
No Drawing. Filed July 20, 1964, Ser. No. 383,950
4 Claims. (Cl. 260—79.3)

This invention relates to new high molecular weight anionic polymers useful as flocculants. More particularly it relates to high molecular weight, water-soluble copolymers of 2-sodiosulfoethyl acrylate with about 5 to 20 weight percent acrylamide and to a process for the preparation of these copolymers.

With ever increasing emphasis on conservation and re-use of water, methods for more effective and efficient removal of suspended particles from aqueous streams have become increasingly important. While many polymers will precipitate finely-divided suspended particles, large amounts are usually required. Also the rate of precipitation is often so slow that water must be impounded for a considerable time in settling reservoirs. Therefore improved flocculating agents, which provide rapid precipitation at a very low concentration, are eagerly sought for many commercial applications not economically feasible with present flocculants.

It has now been discovered that a highly effective flocculating agent is obtained by copolymerizing a limited amount of about 5 to 20 weight percent acrylamide with 2-sodiosulfoethyl acrylate to provide a water-soluble copolymer having a viscosity from about 1.4–5.0 centistokes (cs.) at 100° F. as a 0.1 percent polymer solution in 5 percent NaCl brine. As employed herein, the term "water-soluble" means dispersible in water at a concentration of at least 0.1 weight percent to provide a visually homogeneous and substantially transparent solution infinitely dilutable with water. The amount of acrylamide incorporated in the copolymer is critical in that if less than about 5 weight percent is employed the viscosity of the copolymer is too low for effective flocculation. With more than about 20 weight percent acrylamide, a very viscous copolymer is obtained which is essentially insoluble in 5 percent brine solution.

The monomers employed in the synthesis of these new flocculants are known compounds. Acrylamide is a commercial product, while 2-sodiosulfoethyl acrylate is conveniently prepared by the direct esterification of isethionic acid with glacial acrylic acid as described by Sheetz in U.S. Patent 2,923,734. The monomers are readily copolymerized using conventional techniques.

In practice, copolymers of acrylamide and 2-sodiosulfoethyl acrylate suitable for use as flocculants are preferably prepared by polymerization of an aqueous solution containing 25 to 55 weight percent total monomers at a temperature of from about 0° to 40° C. and advantageously from 5° to 20° C. It has been found that with a total monomer concentration below about 25 weight percent, the viscosity and flocculant activity of the resulting copolymer are low. With a monomer concentration greater than 55 weight percent or a reaction temperature above about 40° C. excessive crosslinking may occur to destroy the water-solubility necessary for use of the copolymer as a fluocculant in aqueous systems.

The aqueous copolymerization is catalyzed by conventional water-soluble addition polymerization initiators such as hydrogen peroxide or a soluble persulfate. The catalyst concentration can range from about 50 to 1000 p.p.m. based on total monomer. Care is needed in the addition of the catalyst since at room temperature a vigorous exothermic polymerization can occur with a rapid increase in temperature to 80°–95° C. and almost immediate gelation. Thus it is preferable to cool the aqueous monomer solution to 5°–10° C. prior to addition of the catalyst. With a low catalyst concentration and proper cooling to maintain a polymerization temperature of about 5°–20° C., smooth polymerization occurs to give a high molecular weight, water-soluble copolymer. Under these conditions polymerization is generally complete within about 4 hours.

In the preferred aqueous polymerization using a 25–55 weight percent monomer concentration and a temperature of about 5°–20° C., copolymerization is generally complete within about 4 hours. The resulting copolymers are obtained as water-soluble gels which are conveniently handled as aqueous solutions containing 5 to 10 weight percent polymer.

Within the general scope of the invention described herein, optimum reaction conditions for a given polymerization system can be determined by those skilled in the art in a routine manner. However, to achieve the desired rapid and efficient flocculation with a low polymer concentration, the copolymer molecular weight as reflected by its viscosity is a critical factor. It has been found that to achieve the desired flocculant activity, a viscosity of from about 1.5–5.0 cs. at 100° F. as a 0.1 percent polymer solution in 5 percent NaCl brine is required.

The following examples illustrate further the invention described herein, but are not to be construed as limiting its scope.

EXAMPLE 1

*Copolymers*

A. A typical copolymer of 2-sodiosulfoethyl acrylate and acrylamide was prepared by dissolving 90 parts of 2-sodiosulfoethyl acrylate in 100 parts of water and adjusting the pH of the solution to about 6 with a saturated solution of sodium carbonate. Then 10 parts of acrylamide was added. The mixture was cooled to 5° C. with stirring and a nitrogen purge to remove air from the reactor. Finally 0.05 part of potassium persulfate was added to initiate polymerization. The reaction temperature was held between 5° and 20° C. by cooling as required. After about 1.0 to 1.5 hours, the mixture gelled and the stirrer was stopped. To assure essentially complete polymerization, the mixture was held at 5°–20° C. for a total of 4 hours before diluting with water to form a 5 percent aqueous solution. This copolymer, which had a viscosity of 4.4 cs. as a 0.1 percent polymer solution in 5 percent NaCl brine at 100° F., was a very effective flocculant.

B. In a similar run wherein the potassium persulfate catalyst was added to the monomer mixture at room temperature, a vigorous, exothermic polymerization ensued with rapid gelation and a temperature rise to 75° C. before effective cooling could be provided. The resulting polymeric gel dissolved with difficulty in water at room temperature. However, the soluble copolymer had a viscosity of 1.6 cs. at 100° F. as a 0.1 percent polymer solution in 5 percent brine, and was an effective flocculant.

EXAMPLE 2

*Polymerization conditions*

To show the effect of polymerization conditions on the properties of a 10 percent acrylamide/90 percent 2-sodiosulfoethyl acrylate copolymer, data from several typical runs with potassium persulfate as catalyst are presented in Table I. Similar results are obtained with a hydrogen peroxide catalyst.

TABLE 1.—POLYMERIZATION CONDITIONS

| Run | Monomer Conc. | Polym. T., °C. | Cat.ᵃ | Viscosity,ᵇ cs. |
|---|---|---|---|---|
| 2-1 | 25 | 5-20 | 0.05 | 1.97 |
| 2-2 | 38 | 5-20 | 0.05 | 4.4 |
| 2-3 | 58 | 30-75 | 0.05 | 1.6 |
| 2-4 | 50 | 30-80 | 0.005 | 1.46 |

ᵃ Wt. percent on total monomer.
ᵇ Viscosity at 100° F. as 0.1 percent solution in 5 percent brine.

EXAMPLE 3

Flocculation screening test

The 2-sodiosulfoethyl acrylate copolymers were screened for flocculant activity using a standard mixture of finely ground (−200 to −300 mesh) clay and coal fines and the following test procedure: To 10.0 g. of the standard, finely-divided solids in a 100 ml. glass-stoppered, graduated cylinder was added sufficient deionized water to make a total volume of 100 ml. The mixture was shaken to form a uniform suspension and then allowed to stand for 30 minutes. Then 1.0 ml. of a 0.1 percent solution of the test polymer was added in 3⅓ ml. portions with careful mixing between each addition by three inversions of the graduated cylinder. After the final polymer addition and intermixing, the time required for the flocculated slurry to settle below the lower 40 ml. mark of the graduate was measured with a stop watch.

In this test, a good flocculant rate is 21 in./min. at a polymer concentration of 10 p.p.m. based on total volume. As shown by the typical results given in Table 2, the 2-sodiosulfoethyl acrylate copolymers containing from about 5 to 20 percent acrylamide and having a viscosity of from about 1.4 to 5.0 cs. as 100° F. as a 0.1 percent solution in 5 percent brine have flocculant rates of from 21 to 65 in./min. By way of comparison, Separan NP-10, a commercial water-soluble, non-ionic, high molecular weight polymer of acrylamide, has a flocculant rate in this test of 15 in./min. at 10 p.p.m.

TABLE 2.—FLOCCULANT TEST

| Polymer | Acrylamide | Viscosity, cs. | Text Conc., p.p.m. | Floc. Rate, in./min. |
|---|---|---|---|---|
| 2-4 | 10 | 1.46 | 10 | 28 |
| 1-B | 10 | 1.6 | 10 | 23 |
| 2-1 | 10 | 1.97 | 10 | 21 |
| 1-A | 10 | 4.4 | 3 | 45 |
| 1-A | 10 | 4.4 | 10 | 65 |

I claim:
1. A water-soluble anionic copolymer of about 80 to 95 weight percent 2-sodiosulfoethyl acrylate and about 20 to 5 weight percent acrylamide, said copolymer being further characterized by a viscosity of about 1.4 to 5.0 cs. at 100° F. as a 0.1 percent solution in 5 percent NaCl brine.

2. The water-soluble copolymer of claim 1, consisting essentially of 90 weight percent 2-sodiosulfoethyl acrylate and 10 weight percent acrylamide.

3. A process for concentrating and separating finely-divided mineral solids from aqueous suspension, which comprises adding to the aqueous suspension from about 1 to 100 p.p.m., based on the weight of the treated suspension, of a water-soluble anionic copolymer of about 80 to 95 weight percent 2-sodiosulfoethyl acrylate and about 20 to 5 weight percent acrylamide having a viscosity of 1.4 to 5.0 cs. at 100° F. as a 0.1 percent solution in 5 percent NaCl brine.

4. The process of claim 3 wherein the anionic copolymer consists essentially of 90 weight percent 2-sodiosulfoethyl acrylate and 10 weight percent acrylamide.

References Cited by the Applicant

UNITED STATES PATENTS

| 2,820,777 | 1/1958 | Suen et al. |
| 2,909,508 | 3/1959 | Jones. |
| 2,923,734 | 2/1960 | Sheetz. |
| 3,024,221 | 3/1962 | LeFevre et al. |

FOREIGN PATENTS 589,543  12/1959  Canada.

JOSEPH L. SCHOFER, *Primary Examiner.*

D. K. DENENBERG, *Assistant Examiner.*